(12) United States Patent
Peters et al.

(10) Patent No.: US 7,528,559 B2
(45) Date of Patent: May 5, 2009

(54) SYNCHRONOUS MOTOR FIELD LOSS RECOVERY

(75) Inventors: David J. Peters, Ontario (CA); James Leonard Rondot, Ontario (CA)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 10/809,301

(22) Filed: Mar. 25, 2004

(65) Prior Publication Data

US 2005/0212467 A1    Sep. 29, 2005

(51) Int. Cl.
*H02P 1/54* (2006.01)
*H02P 5/00* (2006.01)
*H02P 5/46* (2006.01)

(52) U.S. Cl. ..................................... 318/105
(58) Field of Classification Search ................. 318/105
See application file for complete search history.

(56) References Cited

U.S. PATENT DOCUMENTS

| | | | | |
|---|---|---|---|---|
| 4,654,572 A | * | 3/1987 | Hirata ......................... | 318/722 |
| 5,932,935 A | * | 8/1999 | Clifton et al. ................. | 307/60 |
| 5,969,303 A | * | 10/1999 | Piserchia et al. ............. | 187/297 |
| 6,331,941 B1 | * | 12/2001 | Smith .......................... | 363/37 |
| 2005/0184698 A1 | * | 8/2005 | Anghel et al. ................ | 318/715 |

* cited by examiner

*Primary Examiner*—Donovan Lincoln
*Assistant Examiner*—Erick Glass
(74) *Attorney, Agent, or Firm*—Ohlandt, Greeley, Ruggiero & Perle, L.L.P.

(57) ABSTRACT

A synchronous motor system in which recovery due to a failed field excitation supply is achieved automatically without resort to, or by minimizing the length of time in asynchronous operation of the motor. A sensing system is deployed to provide a sensed signal that is caused by a failed field excitation supply to vary from a reference value by a predetermined amount. A control unit responds to detected failure by automatically changing a field winding system of the motor over from the failed field excitation supply to a standby field excitation supply. The standby supply can be shared by several synchronous motors.

14 Claims, 1 Drawing Sheet

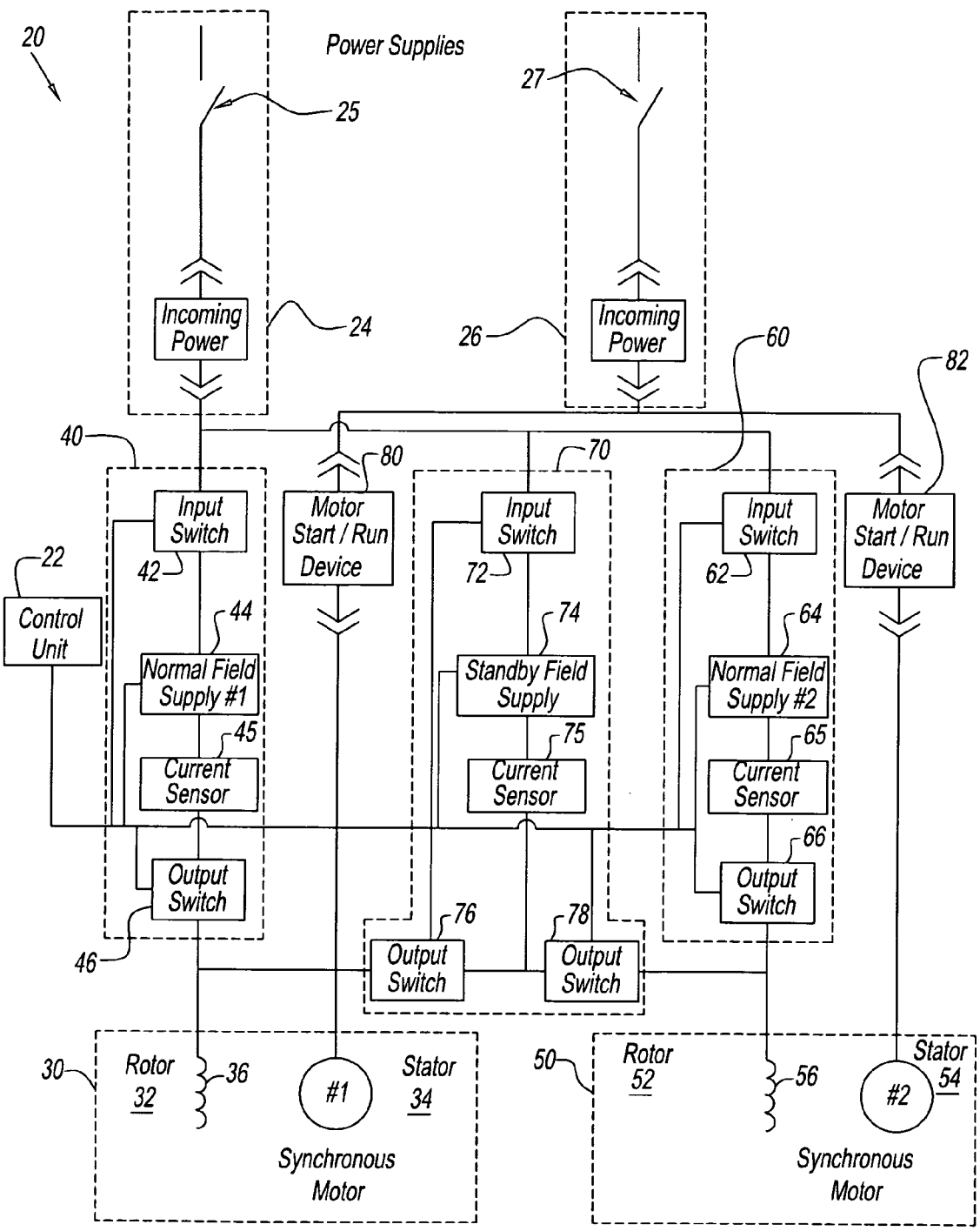

SYNCHRONOUS MOTOR FIELD LOSS RECOVERY

BACKGROUND OF INVENTION

The present disclosure relates to synchronous motors. More particularly, the present disclosure relates to recovery from the loss of a field excitation unit for the motor.

When a synchronous motor loses its field excitation supply, it is either shut down or is operated in an asynchronous mode for the time that it takes to repair the field excitation supply. However, extended operation of the synchronous motor in an asynchronous mode can result in overheating, and requires an oversized motor and power system. Moreover, when operating in an asynchronous mode, a synchronous motor can normally only drive a reduced load vis-a-vis a full load when operating in a synchronous mode.

Accordingly, there is a need to solve the problem of how to recover from the loss of a field excitation supply of a synchronous motor so as to restore the motor to full load synchronous operation while minimizing the time running asynchronously or without resorting to asynchronous operation.

BRIEF DESCRIPTION OF THE INVENTION

A technical effect is a solution of the aforementioned problem that upon detection of a failed normal field supply unit, automatically changes a field winding system of a synchronous motor over to a standby field supply unit, thereby freeing the failed unit for servicing without interruption of the full load operation, or minimizing the time at reduced load, of the motor.

In a system embodiment, a synchronous motor system comprises at least one synchronous motor that includes a field winding system, a normal field supply unit, a standby field supply unit and a control unit. The control unit normally connects the normal field supply unit in circuit with the field winding system and in response to a failure of the normal field supply unit automatically changes over the field winding system from the normal field supply unit to the standby field supply unit.

In a method embodiment, the method recovers from a loss of a field supply unit of a synchronous motor by connecting the normal field supply unit in circuit with a field winding system of the synchronous motor. A failure of the normal field supply unit is detected and in response to the detected failure, the field winding system is automatically changed over from the normal field supply unit to a standby field supply unit.

BRIEF DESCRIPTION OF THE DRAWINGS

The sole FIGURE of the drawing is a block diagram of a synchronous motor system.

DETAILED DESCRIPTION OF THE INVENTION

Referring to the FIGURE, a synchronous motor system is illustrated by way of reference numeral 20. Synchronous motor system 20 includes a plurality of synchronous motors 30 and 50. Although two synchronous motors 30 and 50 are shown, it will be apparent to those skilled in the art that synchronous motor system 20 may include more or less than two synchronous motors.

Synchronous motor 30 includes a rotor 32, a stator 34, a field winding system 36, and a motor start/run device 80. Synchronous motor 50 includes a rotor 52, a stator 54, a field winding system 56, and a motor start/run device 82.

Synchronous motor system 20 also includes a control unit 22, an incoming power supply 24 and an incoming power supply 26, a normal field supply unit 40, a normal field supply unit 60 and a standby field supply unit 70. Although power supply 24 is shown in the diagram as a single source, it may be more than one to provide individual power supplies to the normal and standby field supply units 40, 60 and 70. Similarly, although shown in the FIGURE as a single supply, power supply 26 may be more than one supply to provide individual power supplies to synchronous motor stators 34 and 54. Power supply 24 is a relatively low voltage. Power supply 24 includes a switch 25 that, when closed, connects power supply 24 to normal and standby field supply units 40, 60 and 70 for use as a field excitation voltage. Power supply 26 includes a switch 27 that, when closed, connects power supply 26 to an electrical power source that provides a relatively high voltage to motor start/run devices 80 and 82 for use as a motor stator voltage supply. By way of example, for a large motor application in North America, the relatively high voltage may be 13.8 kilovolts and the relatively low voltage may be 460 volts. Switches 25 and 27 may by operable manually or may be operated automatically as part of an overall control sequence.

Normal field supply unit 40 and normal field supply unit 60 are connected in circuit with synchronous motors 30 and 50, respectively, and with power supply 24. Thus, normal field supply unit 40 includes an input switch 42 mechanism, a normal field supply 44, a current sensor 45, and an output switch mechanism 46. When both input switch 42 mechanism and output switch mechanism 46 are closed, a field excitation voltage is applied to field winding system 36 of synchronous motor 30. Normal field supply unit 60 includes an input switch 62 mechanism, a normal field supply 64, a current sensor 65, and an output switch mechanism 66. When both input switch 62 mechanism and output switch mechanism 66 are closed, a field excitation voltage is applied to field winding system 56 of synchronous motor 50.

Synchronous motor system 20 further includes a standby field supply unit 70 that is shared by synchronous motors 30 and 50. Standby field supply unit 70 is connected in circuit with power supply unit 24 and with both field winding system 36 of synchronous motor 30 and field winding system 56 of synchronous motor 50. Standby field supply unit 70 includes an input switch 72 mechanism, a standby field supply 74, a current sensor 75, an output switch mechanism 76 and an output switch mechanism 78. It will be apparent to those skilled in the art that the input switch mechanisms 42, 62 and 72 and the output switch mechanisms 46, 66, 76 and 78 may be any suitable switching mechanism, such as, circuit breakers, contactors, power relays, motorized switches and the like.

Motor start/run device 80 and motor start/run device 82 are connected in circuit with power supply 26 and in circuit with the windings of motor stators 34 and 54 of synchronous motors 30 and 50, respectively. Motor start/run devices 80 and 82 may be simple switching devices that start and run synchronous motors 30 and 50 by applying rated voltage to stators 34 and 54 to accelerate motors 30 and 50 to synchronizing speed, at which point the motor field is applied to pull motors 30 and 50 into synchronism. Alternatively, motor start/run devices 80 and 82 may be assisted starting systems, such as reactor-assist, autotransformer-assist, capacitor-assist, capacitor-reactor-assist, electronically-controlled starter, or similar scheme. These schemes are designed to accelerate the synchronous motor to synchronizing speed (and subsequent pull-in to synchronous operation by applying the motor field), while minimizing the impact of starting the motor on the power system 26. Alternatively, motor start/ run devices 80 and 82 may be variable-voltage or variable-speed drive systems, having the ability to start and run the motor at variable speed.

Control unit 22 has connections to output switch mechanisms 46, 66, 76 and 78 to control the opening and closing thereof. Control unit 22 also has connections to input switch mechanisms 42, 62 and 72, to control the opening and closing thereof, where desirable to achieve correct functioning of the operational strategy. Control unit 22 also has connections to normal field supply 44, normal field supply 64 and standby field supply 74 to properly co-ordinate the functioning of these devices during operation and changeover.

In a normal operating mode, normal field supply units 40 and 60 are operable to provide voltage to field winding systems 36 and 56 of synchronous motors 30 and 50, respectively. To this end, control unit 22 controls output switch mechanisms 46 and 66 to be closed and output switch mechanisms 76 and 78 to be open. Thus, normal field supply units 40 and 60 are connected to synchronous motors 30 and 50, but standby field supply unit 70 is not connected to either synchronous motor 30 or 50.

Current sensors 45, 65 and 75 of field supplies 40, 60 and 70 sense the respective field load currents and provide these sensed currents to control unit 22. If normal field supply unit 40 should fail or have faulty operation, the load current of synchronous motor 30 field system will deviate from a reference value. If this deviation exceeds a predetermined amount, a failure will be detected. In response to the detected failure, control unit 22 automatically changes field winding system 36 from normal field supply unit 40 over to standby field supply unit 70. To accomplish this, control unit 22 opens output switch mechanism 46 of normal field supply unit 40 and closes output switch mechanism 76 of standby field supply unit 70. In this scenario, synchronous motor 30 is now receiving field voltage from standby field supply unit 70 and synchronous motor 50 continues to receive field voltage from normal field supply unit 60. Faulty normal field supply unit 40 is disconnected from synchronous motor 30 and, therefore, is available for servicing.

On the other hand, if normal field supply unit 60 should fail or have faulty operation, the load current of synchronous motor 50 field system will deviate from a reference value. If this deviation exceeds a predetermined amount, a failure will be detected. In response to the detected failure, control unit 22 automatically changes field winding system 56 from normal field supply unit 60 over to standby field supply unit 70. To accomplish this, control unit 22 opens output switch 66 of normal field supply unit 60 and closes output switch 78 of standby field supply unit 70. In this scenario, synchronous motor 50 is now receiving field voltage from standby field supply unit 70 and synchronous motor 30 continues to receive field voltage from normal field supply unit 40. Faulty normal field supply unit 60 is disconnected from synchronous motor 50 and, therefore, is available for servicing.

The reference value may be determined as a percentage or absolute value of the desired field current. Desired field current is derived from the motor field regulating system that is a part of control unit 22. In the case of a DC-fed exciter, such as would typically be found on a constant-speed motor application, where the motor is synchronized to a fixed-frequency power supply, the reference value would be compared with the DC line current in the motor field system. Alternatively, in the case of an ac-ed excitation system, such as would typically be found on a variable-speed motor drive application, the reference value would be compared with the average of the individual phase currents to the motor field system.

It will be apparent to those skilled in the art that although field winding current is sensed in the illustrated exemplary embodiment, other electrical parameters could be sensed, as well, provided they vary in response to a failure of the normal field supply unit.

In either of the aforementioned scenarios, the motor with the unfaulted field power supply will continue to operate with full load rating being available. The motor having the faulted field power supply may continue to operate at rated power, or may temporarily run asynchronously until the load torque has been reduced to allow re-synchronization to take place. The load reduction initiation and re-synchronization process is normally carried out under the automatic control of the control unit 22. In the event that both normal field power supply units fail simultaneously, and when only one standby unit is installed, one motor would be shutdown, and the standby unit switched to the other motor to enable its continued operation.

It should be apparent to those skilled in the art that current sensors 45, 65 and 75 can be packaged in the field supply units, installed in the synchronous motors 30 and 50 or can be separate units. It will be further apparent to those skilled in the art that standby field supply unit 70 can be shared by more than two synchronous motors. It will be further apparent that in some synchronous motor system embodiments, more than one standby field supply unit may be used and shared by two or more of the motors.

It should also be apparent to those skilled in the art that the disclosure described herein applies to synchronous motors, whether started full-voltage (direct-on-line), by an assisted of 'soft' starter, or when run at variable speed from a drive system.

It should also be apparent to those skilled in the art that the disclosure described herein applies to different types of field supply units. For example, the field supply units may be either brushless DC excitation or slipring DC excitation for fixed speed operation. Alternatively and by way of example, the field supply units may be brushless AC excitation for variable speed operation or slipring DC excitation for variable speed operation.

It should also be apparent to those skilled in the art that the disclosure described herein applies to various power supplies, e.g., one power supply to all of the field supply units, separate power supplies to each of the field supply units, one power supply to all motor stators or separate power supplies to each of the motor stators.

It should also be noted that the terms "first", "second", "third", "upper", "lower", and the like may be used herein to modify various elements. These modifiers do not imply a spatial, sequential, or hierarchical order to the modified elements unless specifically stated.

While the present invention has been described with reference to one or more exemplary embodiments, it will be understood by those skilled in the art that various changes may be made and equivalents may be substituted for elements thereof without departing from the scope of the present invention. In addition, many modifications may be made to adapt a particular situation or material to the teachings of the disclosure without departing from the scope thereof. Therefore, it is intended that the present invention not be limited to the particular embodiment(s) disclosed as the best mode contemplated for carrying out this invention, but that the invention will include all embodiments falling within the scope of the appended claims.

What is claimed is:

1. A synchronous motor system comprising:
   at least one synchronous motor that includes a field winding system;

a normal field excitation supply unit and a standby field excitation supply unit; and a control unit that normally connects said normal field excitation supply unit in circuit with said field winding system and that in response to a failure of said normal field excitation supply unit automatically changes over said field winding system from said normal field excitation supply unit to said standby field excitation supply unit, wherein said synchronous motor is one of a plurality of synchronous motors that each have a field winding system, wherein said normal field excitation supply unit is one of a plurality of normal field excitation supply units, each of which is associated with a different one of said synchronous motors, wherein said control unit responds to a failure of any one of said normal field excitation supply units to change the field winding system of the associated synchronous motor over to the standby field excitation supply unit.

2. The synchronous motor system of claim 1, wherein said control unit controls a normal output switching mechanism to connect and disconnect said normal field excitation supply unit and a standby output switching mechanism to connect and disconnect said standby field excitation supply unit to and from said field winding system.

3. The synchronous motor system of claim 1, further comprising:

a sensor connected in circuit with said normal field excitation supply unit and said synchronous motor so as to provide a signal representative of an electrical parameter, and wherein said control unit responds to said signal deviating by a predetermined amount from a reference value of said parameter to automatically change said field winding system over to said standby field excitation supply unit.

4. A method for recovery from a loss of a normal field excitation supply unit of a synchronous motor comprising:

normally connecting said normal field excitation supply unit in circuit with a field winding system of said synchronous motor;

detecting a failure of said normal field excitation supply unit; and in response to said detected failure, automatically changing over said field winding system from said field normal excitation supply unit to a standby field excitation supply unit, wherein the steps of connecting, detecting and automatically changing over are performed for each of a plurality of synchronous motors, and wherein said standby excitation supply field unit is shared by all of said synchronous motors.

5. The method of claim 4, wherein said failure corresponds to a predetermined deviation from a reference value of a signal that is sensed from said synchronous motor field winding system.

6. A synchronous motor system comprising:

a first synchronous motor including a first field winding system and a first field excitation supply unit, said first field excitation supply unit being in selective electrical communication with said first field winding system;

a second synchronous motor including a second field winding system and a second field excitation supply unit, said second field excitation supply unit being in selective electrical communication with said second field winding system; and a standby field excitation supply unit being in selective electrical communication with said first field winding system or said second field winding system.

7. The synchronous motor system of claim 6, further comprising a control unit that normally connects said first field excitation supply unit in circuit with said first field winding system and said second field excitation supply unit in circuit with said second field winding system.

8. The synchronous motor system of claim 7, wherein said control unit, in response to a failure of said first field excitation supply unit automatically changes over said first field winding system from said first field excitation supply unit to said standby field excitation supply unit and, in response to a failure of said second field excitation supply unit automatically changes over said second field winding system from said second field excitation supply unit to said standby field excitation supply unit.

9. The synchronous motor system of claim 8, wherein said control unit changes over said first field winding system from said first field excitation supply unit to said standby field excitation supply unit when a first parameter of said first field excitation supply unit exceeds a reference value and changes over said second field winding system from said second field excitation supply unit to said standby field excitation supply unit when a second parameter of said second field excitation supply unit exceeds said reference value.

10. The synchronous motor system of claim 9, wherein said first parameter comprises a field load current of said first field excitation supply unit and said second parameter comprises a field load current of said second field excitation supply unit.

11. The synchronous motor system of claim 10, wherein said reference value comprises a percentage of a desired field current.

12. The synchronous motor system of claim 10, wherein said reference value comprises an absolute value of a desired field current.

13. A synchronous motor system comprising:

a first synchronous motor having a field winding system;

a normal field excitation supply unit configured to supply a normal field excitation voltage, said normal field excitation voltage being sufficient to operate said first synchronous motor synchronously;

a standby field excitation supply unit configured to supply a standby field excitation voltage, said standby field excitation voltage being sufficient to operate said first synchronous motor synchronously; and at least one switching mechanism configured to apply either said normal field excitation supply unit or said standby field excitation supply unit to said field winding system.

14. The synchronous motor system of claim 13, further comprising a control unit that normally operates said at least one switching mechanism to apply said normal field excitation voltage to said field winding system and that, in response to said normal field excitation voltage deviating by a predetermined amount from a reference value, automatically operates said at least one switching mechanism to apply said standby field excitation voltage to said field winding system.

* * * * *